United States Patent
Kim et al.

(10) Patent No.: US 9,597,981 B2
(45) Date of Patent: Mar. 21, 2017

(54) APPARATUS FOR LOCKING VEHICLES SEAT-RAIL

(71) Applicant: HYUNDAI DYMOS INCORPORATED, Seosan-si, Chungcheongnam-do (KR)

(72) Inventors: Hyun Soo Kim, Seoul (KR); Jong Tak Lee, Gwangmyeong-si (KR)

(73) Assignee: HYUNDAI DYMOS INCORPORATED, Seosan (KR)

( * ) Notice: Subject to any disclaimer, the term of this patent is extended or adjusted under 35 U.S.C. 154(b) by 0 days.

(21) Appl. No.: 14/982,087

(22) Filed: Dec. 29, 2015

(65) Prior Publication Data

US 2016/0185260 A1  Jun. 30, 2016

(30) Foreign Application Priority Data

Dec. 30, 2014 (KR) ........................ 10-2014-0193208

(51) Int. Cl.
  *B60N 2/00* (2006.01)
  *B60N 2/08* (2006.01)

(52) U.S. Cl.
  CPC ......... *B60N 2/0875* (2013.01); *B60N 2/0806* (2013.01); *B60N 2/0818* (2013.01); *B60N 2/0856* (2013.01)

(58) Field of Classification Search
  CPC ............................ B60N 2/0875; B60N 2/0806
  USPC ....................................................... 248/429
  See application file for complete search history.

(56) References Cited

U.S. PATENT DOCUMENTS

| 5,816,110 A * | 10/1998 | Schuler | B60N 2/0705 248/429 |
|---|---|---|---|
| 6,308,589 B1 * | 10/2001 | Schuler | B60N 2/0705 248/429 |
| 6,637,712 B1 * | 10/2003 | Lagerweij | B60N 2/0705 248/429 |
| 7,780,138 B1 * | 8/2010 | Lee | B60N 2/0705 248/429 |
| 9,156,376 B2 * | 10/2015 | Yamada | B60N 2/08 |
| 2007/0090262 A1 * | 4/2007 | Sung | B60N 2/0825 248/429 |
| 2008/0308704 A1 * | 12/2008 | Kostin | B60N 2/0881 248/503.1 |
| 2014/0263920 A1 * | 9/2014 | Anticuar | B60N 2/0705 248/429 |

(Continued)

FOREIGN PATENT DOCUMENTS

JP   H4-104026 U   9/1992
JP   10-2010-0049457   5/2010

(Continued)

*Primary Examiner* — Anita M King
(74) *Attorney, Agent, or Firm* — Brinks Gilson & Lione (57) ABSTRACT

An apparatus to lock a vehicle seat-rail includes a locking pin to pass through a fixing bracket, and a detachment preventing device to inhibit the locking pin from being detached from the fixing bracket in a direction, while the locking pin moves on the fixing bracket. In particular, the detachment preventing device includes: a catching jaw formed in the locking pin; a guide hole formed in an end of the fixing bracket; and a bush to wrap around the locking pin. The catching jaw is caught the bush and thus the locking pin inserted in the guide hole is inhibited from being detached.

13 Claims, 8 Drawing Sheets

(56) References Cited

U.S. PATENT DOCUMENTS

2016/0193942 A1\* 7/2016 Kim ................... B60N 2/0875
                                              248/429

FOREIGN PATENT DOCUMENTS

| KR | 10-1299015 | 8/2013 |
| KR | 10-2014-0068670 | 6/2014 |

\* cited by examiner

APPARATUS FOR LOCKING VEHICLES SEAT-RAIL

CROSS-REFERENCES TO RELATED APPLICATION

This application claims the benefit of Korean Patent Application No. 10-2014-0193208, filed on Dec. 30, 2014, which is hereby incorporated by reference in its entirety.

FIELD

The present disclosure relates to an apparatus for locking a vehicle seat-rail that improves the assembly convenience and enhances space utilization of the seat-rail.

BACKGROUND

The statements in this section merely provide background information related to the present disclosure and may not constitute prior art.

In general, seats installed in a vehicle can be adjusted while sliding forward and backward to match the passenger's body conditions, and an apparatus for locking the seat-rails for fixing the moved seat is installed below the seats.

Figure 1:
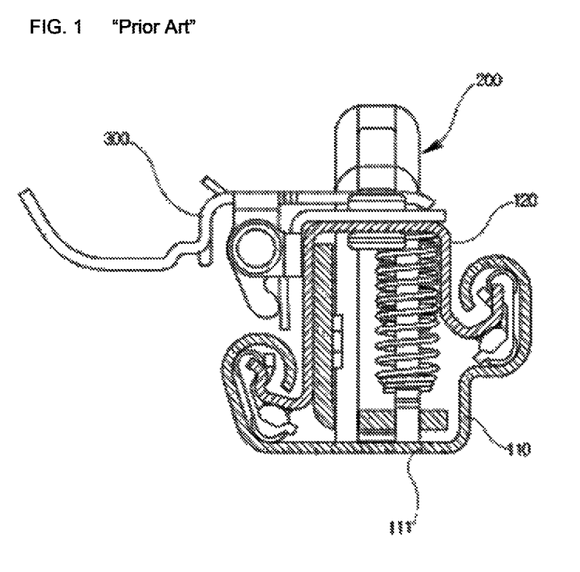
FIG. 1 is a diagram for explaining a structure of a seat-rail locking apparatus according to a related art.

FIG. 1 illustrates a "seat-rail locking apparatus" according to the prior art (i.e., Korean Patent No. 10-1294388) that is configured to include a low rail 110 that is coupled to a floor panel inside a passenger compartment, an upper rail 120 that is installed to slide along the low rail 110 while being coupled to the seat cushion frame, and a locking pin assembly 200 that restrains the free movement of the upper rail 120 relative to the low rail 110.

Further, the locking pin assembly 200 is provided with a pin member 210 through the upper end of the upper rail 120, and a lower end portion of the pin member 210 is fitted to a locking hole 111 formed in the low rail 110 to constrain the sliding movement of the upper rail 120, thereby being able to fix the forward and backward movements of the seat.

Here, a rotationally operated locking lever 300 is installed on the side surface of the upper rail 120, and the end portion of the locking lever 300 is configured to be caught in the pin member 210 protruding to the upper side of the upper rail 120.

Therefore, when rotationally operating the locking lever, while the pin member caught in the end portion of the locking lever is moved upward toward the upper portion, the lower end portion of the pin member is disengaged from the locking hole, thereby making it possible to move the seat back and forth, while allowing the sliding movement of the upper rail with respect to the low rail.

However, in the conventional seat-rail locking apparatus, since the end portion of the locking lever is located above the upper rail and the locking lever is fitted to the pin member, an amount of protrusion of the upper end of the pin member protruding to the upper side of the upper rail increases.

To solve this problem, a structure configured so that the unlocking operation of the locking lever and the pin member is performed inside the seat-rail is suggested. However, in this case, since the lower end portion of the locking pin and the end portion of the locking lever should be inserted into the seat-rail, the locking pin and the locking lever are separately assembled to the seat-rail, thereby reducing the assembling and operating convenience of the components for forming the locking apparatus.

The above-mentioned matters described as the background art are only for understanding of the background of the present disclosure, but should not be recognized as corresponding to the already known prior art to those of ordinary skill in the art.

SUMMARY

The present disclosure provides an apparatus for locking a vehicle seat-rail which reduces interference with the seat-rail, while assembling the locking pin and the locking lever to the seat-rail at a time, thereby improving convenience associated with the assembling operation.

Another aspect of the present disclosure is to provide an apparatus for locking a vehicle seat-rail which enhances space usability of the seat-rail upper portion and reduces the exposure of the components to the outside, by providing that the unlocking operation of the locking pin is performed in a space in the upper rail.

According to one form of the present disclosure, there is provided an apparatus for locking a vehicle seat-rail that includes a locking pin that is provided to pass through the fixing bracket and is linearly movable; and a detachment preventing means that prevents the locking pin from being detached from the fixing bracket in a direction, while allowing the linear movement of the locking pin.

In the detachment preventing means, a catching jaw is formed in one end portion of the locking pin; a guide hole is formed at the end portion of the fixing bracket, the other end portion of the locking pin is provided to pass through the guide hole; and a fixing bush that is formed in a shape to wrap around the locking pin and is fixed to the inner surface of the guide hole, while guiding the locking pin, its end portion being caught on the catching jaw.

The fixing bush may include a support plate in which a bush hole is formed, the locking pin is inserted into the bush hole and which is supported on the bottom surface of the fixing bracket; an engaging hook portion that is formed to be spaced along the circumferential direction of the bush hole, is fixed to the support plate at a lower end portion, and has an upper end portion caught on the upper surface of the fixing bracket, while passing through the guide hole; and a support portion that is formed to be spaced along the circumferential direction of the bush hole, is fixed to the support plate at a lower end portion, and has an upper end portion caught on the bottom surface of the catching jaw, while passing through the guide hole.

The engaging hook portion and the support portion may be alternately arranged along the circumferential direction of the bush hole.

Each of the engaging hook portion and the support portion may be arranged to face each other around the axial center of the bushing hole.

The upper end portion of the support portion is formed to be bent toward the axial center of the bushing hole, and the locking pin may slide along the upper end inner circumferential surface of the support portion that is formed to be bent.

The catching jaw is formed with an inclined portion in a shape that is gradually narrowed toward the one end portion of the locking pin at the interruption of the locking pin, a maximum diameter of the locking pin meeting the upper end portion of the inclined portion is formed to correspond to the diameter of the lower end portion of the inclined portion, and the catching jaw is be formed on the upper end portion of the inclined portion.

The apparatus further includes a moving rail with the fixing bracket fixed to an outer surface thereof; and an unlock lever in which an interruption is rotatably coupled to the fixing bracket; a rotation stopper is formed to protrude from the side surface of the unlock lever, and a fixing stopper is provided on the path in which the rotation stopper rotates, thereby regulating the unlock lever from excessively rotating in one direction at the time of rotation of the unlock lever.

The unlock lever is provided so that the one end portion is located outside the moving rail and the other end portion is located inside the moving rail; the rotation stopper is formed between the interruption of the unlock lever and the one end portion; the fixing stopper is formed at the upper end position of the portion in which the unlock lever is axially coupled, and the rotation stopper is caught on the fixing stopper when the one end portion of the unlock lever rotates toward the upper end portion of the fixing bracket.

Lever coupling portions are formed to protrude from both side ends of the fixing bracket; the interruption of the unlock lever is axially coupled between the lever coupling portion; and the fixing stopper may be formed to protrude from the upper end of the lever coupling portion.

A circular pinhole is formed at the center of the lever coupling portion; the hinge pin is coupled to the interruption of the unlock lever; and both end portions of the hinge pin are coupled to the pinhole to pass through, thereby being able to inhibit the detachment of the hinge pin coupled to the pin hole.

A lever assembly in which the unlock lever is coupled to the side portion of the fixing bracket while the locking pin penetrates the fixing bracket is assembled in a module; an upper engaging window and a side engaging window are formed in each of the upper end portion and the side end portion of the moving rail; upon assembly of the lever assembly to the moving rail, while the lower end portion of the locking pin is inserted to the upper engaging window and the other end portion of the unlock lever is inserted to the side engaging window, the fixing bracket can be fixed to the outer upper surface and the side surfaces of the moving rail formed around the engaging window.

An unlock flange is formed at the interruption of the locking pin; and upon assembly of the lever assembly to the moving rail, the unlock flange can be located in the interior space of the moving rail.

A plurality of locking pins is provided; the other end portion of the unlock lever is formed in a fork shape, and when the unlock lever rotates, the other end portion of the unlock lever is caught on the bottom surface of the unlock flange to vertically operate the locking pin.

Through the means for solving the problem as described above, according to the present disclosure, since one end portion of the unlock lever is inhibited from being excessively rotated in the direction toward the upper end portion of the fixing bracket, it is possible to appropriately regulate the position of the other end portion of the unlock lever. Therefore, when assembling the lever assembly to the moving rail, since the locking pin and the unlock lever are simultaneously inserted to the engaging window formed in the moving rail without interfering with the moving rail, there is an effect of improving the ease of assembly of the lever assembly.

Further, since the upward movement operation of the locking pin is performed within the internal space of the seat-rail, the parts attached or exposed to the outside of the seat-rail are reduced to enhance the space utilization formed at the top of the moving rail, and thus, a compact seat-rail may be designed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be understood that although the terms "first", "second", etc. are used herein to describe various elements, these elements should not be limited by these terms. These terms are only used to distinguish one element from another element.

A seat-rail locking apparatus of the present disclosure is configured to largely include a fixing bracket 40 and an unlock lever 50.

Prior to describing the characteristic technical construction of the present disclosure, the coupling and operating relation between the moving rail 10 and the fixed rail 20 will be briefly described with reference to FIG. 2. The fixed rail 20 is coupled to a floor panel (not illustrated) in a passenger compartment in a front and rear lengthwise direction, and the moving rail 10 is installed to slide along the fixed rail 20, while being coupled to a seat cushion frame (not illustrated).

Further, a plurality of locking holes 21 may be formed at the horizontally formed lower end portion of the fixed rail 20 along its length at regular intervals, and a plurality of locking pins 70 may be provided by being to inserted in an upper engaging window 11 formed in the upper end portion of the moving rail 10 formed to face the fixed rail 20 side by side along its lengthwise direction.

Further, an operating portion 51 is formed at the one end portion of the unlock lever 50, a hinge portion 55 is formed at an interruption, and a fork portion 53 is formed at the other end portion. Thus, at the time of pushing operation of the operating portion 51, the fork portion 53 is rotationally operated around the hinge portion 55.

Thus, at the time of the rotational operation of the unlock lever 50, the fork portion 53 formed at the other end portion is operated to raise the locking pin 70 upward to move the locking pin 70 upward, and thus, the locking pin 70 is detached from the locking hole 21 of the fixed rail 20 to unlock the seat-rail.

Figure 6:
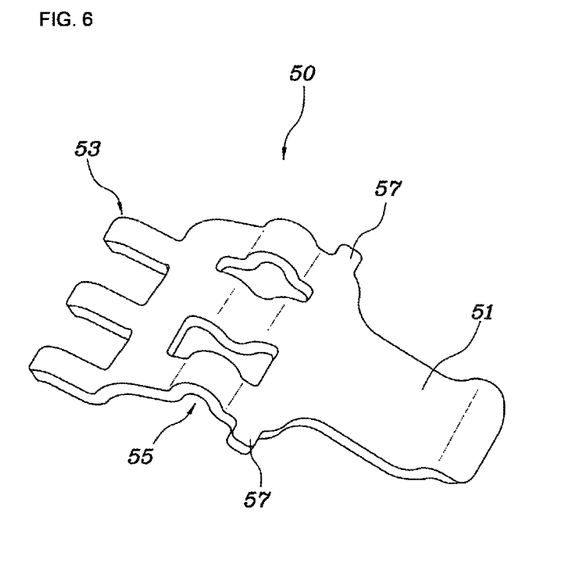
FIG. 6 is a diagram for explaining a shape of the unlock lever.

At this time, as illustrated in FIG. 6, the hinge portion 55 can be formed in a structure that wraps around the hinge pin 60 so that the hinge pin 60 described later is inserted and the unlock lever 50 can pivot about the hinge pin. Also, the fork portion 53 can be formed so that a plurality of fork pins is spaced at predetermined intervals, the fork pin is between the locking pins 70, and the fork pins can be formed to be smaller by one than the number of the locking pins.

Figure 3:
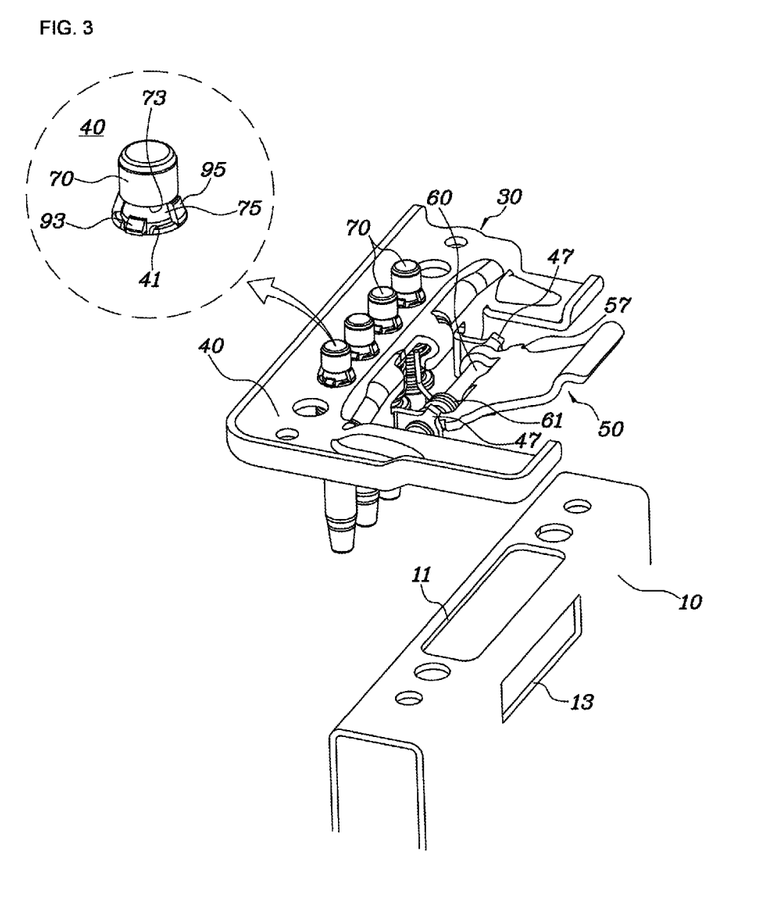
FIG. 3 is a diagram illustrating a state in a lever assembly and a moving rail are disassembled in the seat-rail locking apparatus.
Figure 4:
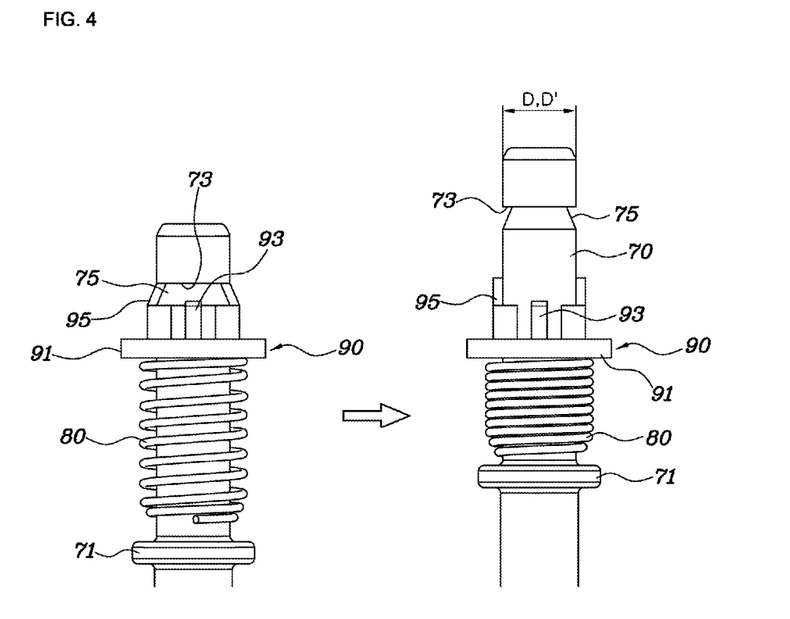
FIG. 4 is a diagram for explaining the state before and after operation of the locking pin.
Figure 5:
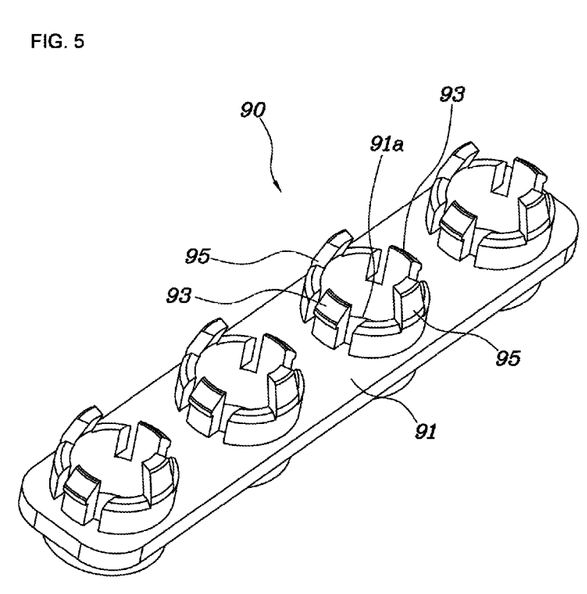
FIG. 5 is a diagram for explaining the shape of the fixing bush.

Meanwhile, referring to FIGS. 3 to 5, the locking pin 70 of the present disclosure is provided to vertically penetrate at the end portion of the fixing bracket 40 and is provided to be vertically and linearly movable.

In particular, the detachment preventing means may be configured to inhibit the locking pin 70 from being detached downward from the fixing bracket 40, while allowing the linear movement of the locking pin 70.

The above detachment preventing means will be described. A catching jaw 73 is formed in the upper end portion of the locking pin 70. Further, a plurality of guide holes 41 is formed at the end portion of the fixing bracket 40, and the other end portion of the locking pin 70 is provided to penetrate the guide hole 41.

At this time, a fixing bush 90 may be provided between the outer surface of the outer surface of the locking pin 70 and the inner surface of the guide hole 41, the fixing bush 90 is formed to have a shape that wraps around the locking pin 70, the locking pin 70 is guided along the inner surface, and the outer surface is fixed to the inner surface of the guide hole 41. Further, the bottom surface of the catching jaw 73 is caught on the upper end portion of the fixing bushing 90, and thus, the locking pin 70 inserted in the guide hole 41 of the fixing bracket 40 is inhibited from being detached in the lower part of the guide hole 41.

That is, according to the configuration described above, before the fixing bracket 40 is assembled to the moving rail 10, the locking pin 70 is assembled to the fixing bracket 40, and the locking pin 70 is inhibited from being detached from the fixing bracket 40 by the detachment preventing means.

Therefore, when the lever assembly 30 including the fixing bracket 40, the unlock lever 50 and the locking king pin 70 is assembled to the moving rail 10 later, the lever assembly 30 can be simply inserted and assembled to the moving rail 10, without a risk of detachment of the locking pin 70.

In the present disclosure, the fixing bush 90 can be integrally inserted into each guide hole 41, and can be configured to include the support plate 91, the engaging hook portion 93 and the support portion 95.

Referring to FIGS. 3 to 5 again, the support plate 91 is formed with the bush holes 91a at the position corresponding to the guide hole 41, the locking pin 7 is inserted to the bush hole 91a, and its upper surface can be supported on the bottom surface of the fixing bracket 40.

Further, the engaging hook portion 93 is formed to be spaced at a predetermined interval along the circumferential direction of the bush hole 91a, its lower end portion is fixed to the support plate 91, and its upper end portion is caught on the upper surface of the fixing bracket 40, i.e., around the upper end of the guide hole 41 in a hook structure, while passing through the guide hole 41.

The support portion 95 is formed to be spaced at a predetermined along the circumferential direction of the bush hole 91a, its lower end portion is fixed to the support plate 91, and its upper end portion can be supported on the bottom surface of the catching jaw 73, while passing through the guide hole 41.

At this time, the locking jaws 73 is formed with an inclined portion 75 having a shape that is gradually narrowed toward the upper end portion of the locking pin 70 at the interruption of the locking pin 70, and the maximum diameter D of the locking pin 70 that meets the upper end portion of the inclined portion 75 is formed to correspond to the diameter D' of the lower end portion of the inclined portion 75, and the catching jaw 73 can be formed at the upper end portion of the inclined portion 75.

Further, the engaging hook portion 93 and the support portion 95 may be alternately arranged along the circumferential direction of the bush hole 91a.

In addition, the engaging hooks 93 are arranged to be opposed each other around the axial center of the bush hole 91a, each support portion 95 may be arranged to be opposed to each other around the axial center of the bush hole 91a.

In addition, the upper end portion of the support part 95 is formed to be bent toward the axial center of the bush hole 91a, and the outer circumferential surface of the locking pin 70 can be moved while sliding along the inner circumferential surface of the upper end portion of the support portion 95 which is formed to be bent.

That is, since the upper end portion of the support portion 95 is formed to be bent toward the locking jaws 73, before the lever assembly 30 is assembled to the moving rail 10, the upper end portion of the support 95 is caught on the bottom surface of the catching jaw 73, the detachment of the locking pin 70 is inhibited. After the assembling of the lever assembly 30, when the locking pin 70 is operated, the upper end portion of the support portion 95 radially outward opens, while moving along the inclined portion 75, thereby allowing the vertical movement of the locking pin 70.

Meanwhile, referring to FIGS. 2 and 3, the fixing bracket 40 is provided in a shape to partially cover the upper surface and the side surface of the moving rail 10, and the unlock lever 50 and the locking pin 70 described below are coupled to each other to form the lever assembly 30.

The interruption of the unlock lever 50 is rotatably and pivotally coupled to the fixing bracket 40.

At this time, a rotation stopper 57 is formed to protrude from the side surface of the unlock lever 50, and a fixing stopper 47 is provided in a rotation path of the rotation stopper 57 to regulate that excessive rotation of the unlock lever 50 in one direction.

Figure 2:
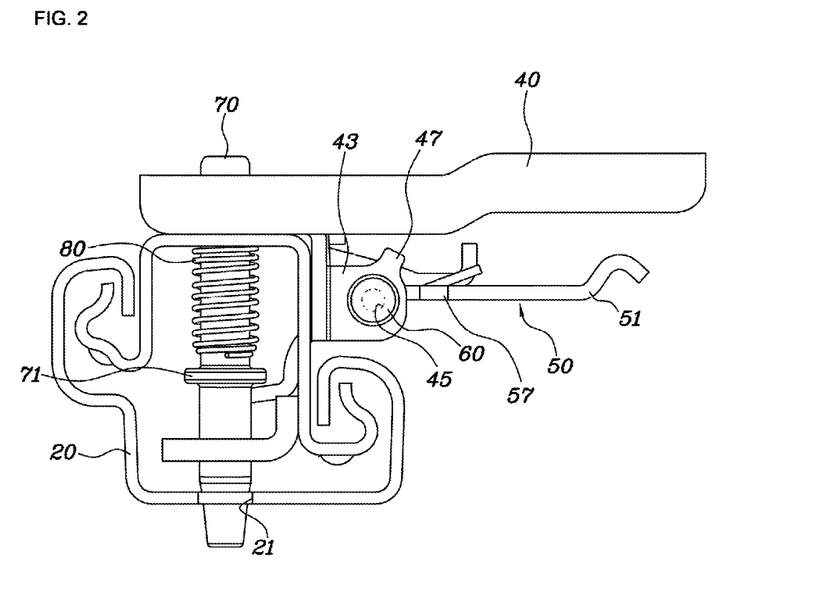
FIG. 2 is a diagram for explaining a structure of a seat-rail locking apparatus.

For example, as illustrated in FIGS. 2 and 4, the unlock lever 50 is provided so that, when assembled to the moving rail 10, the operating portion 51 formed at one end portion is located outside the moving rail 10 and the fork portion 53 formed at the other end portion is located inside the moving rail 10.

Thus, the rotation stopper 57 may be formed on the side surface toward one end portion at the interruption of the unlock lever 50, and the fixing stopper 47 may be configured so that the unlock lever 50 is formed at the upper end position of the pivotally coupled portion, and the rotation stopper 57 is caught in the fixing stopper 47 when the one end portion of the unlock lever 50 rotates toward the upper end portion of the fixing bracket 40.

Here, the lever coupling portions 43 are formed to protrude from both side ends of the fixing bracket 40, and the interruption of the unlock lever 50 is pivotally coupled between the both lever coupling portions 43. According to this, the fixing stopper 47 may be formed to protrude from the upper end of the lever coupling portion 43.

That is, according to the configuration described above, before the fixing bracket 40 is assembled to the moving rail 10, in a state in which the unlock lever 50 is pivotally coupled to the lever coupling portion 43, the rotation stopper 57 formed in the unlock lever 50 is caught in the fixing stopper 47 formed in the lever coupling portion 43.

Thus, the one end portion of the unlock lever 50 is inhibited from being excessively rotated in the direction toward the upper end portion of the fixing bracket 40, thereby being able to appropriately regulate the position of the other end portion of the unlock lever 50. Thus, in the future, when the lever assembly 30 including the fixing bracket 40, the unlock lever 50 and the locking pin 70 is assembled to the moving rail 10, the unlock lever 50 and the locking pin 70 can be assembled by being simply inserted into the moving rail 10.

In addition, referring to FIGS. 2 and 3, a circular pinhole 45 is formed at the intermediate of the lever coupling portion 43, and the hinge pin 60 can be coupled to the interruption of the unlock lever 50. At this time, an unlock restoring spring 61 can be prepared in the hinge pin 60 to provide an elastic restoring force to the unlocking rotation direction of the unlock lever 50. Here, one end of the unlock restoring spring 61 can be supported on a bottom surface of one end portion of the unlock lever 50, and the other end portion of the unlock restoring spring 61 can be supported on a part of the fixing bracket 40.

In particular, since the both end portions of the hinge pin 60 is coupled through the pinhole 45, the detachment of the hinge pin 60 coupled to the pin hole 45 can be inhibited.

That is, since only the pin hole 45 is formed on the lever coupling portion 43, after assembling by inserting the hinge pin 60 to the pinhole 45, the hinge pin 60 cannot be detached from the pin hole 45.

Figure 7:
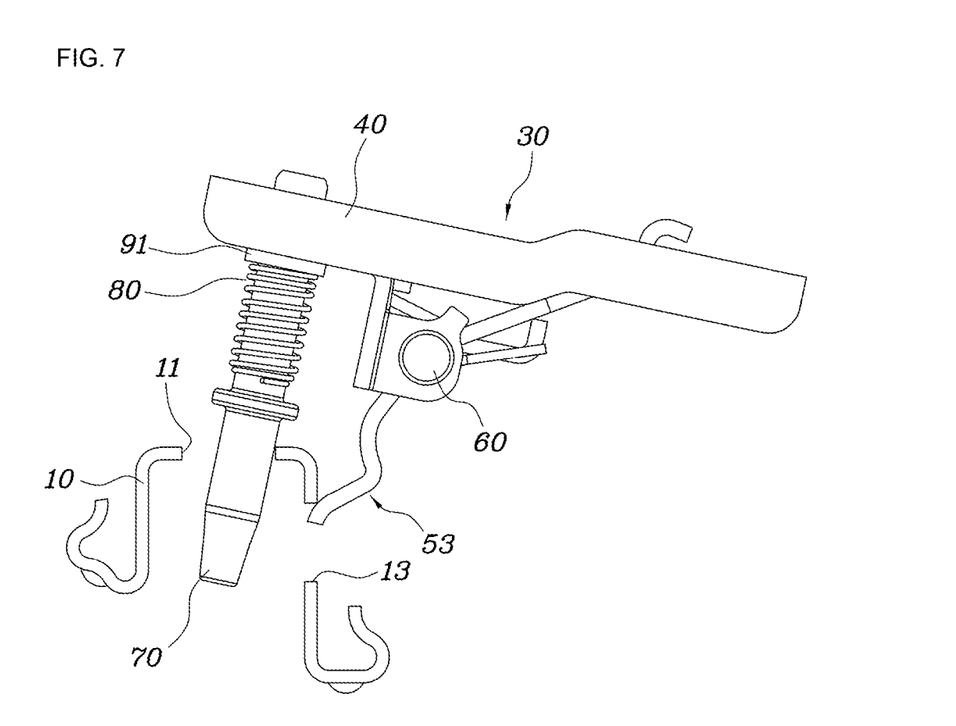
FIG. 7 is a diagram for explaining a method of assembling the lever assembly to the moving rail in the seat-rail locking apparatus.

Meanwhile, referring to FIGS. 3 and 7, while the lower end portion of the locking pin 70 penetrates the fixing bracket 40, the unlock lever 50 is coupled to the side portion of the fixing bracket 40 to form the lever assembly 30, and the lever assembly 30 may be assembled in a module.

Further, each of the upper engaging window 11 and the side engaging window 13 is formed in the upper end portion and side end portion of the moving rail 10 in an open shape. At this time, since a section between both the lever coupling portions 43 corresponding to the hinge pin 60 is also formed in an open shape, the open portion can be assembled with the side engaging window 13 in an overlapping manner, and the other end portion of the unlock lever 50 can be inserted into the side engaging window 13.

According to this, when assembling the moving rail 10 to the lever assembly 30, the lower end portion of the locking pin 70 is inserted to the upper engaging window 11, and at the same time, the other end portion of the unlock lever 50 is inserted to the side engaging window 13. Thus, since the fixing bracket 40 is fixed in a state of surface contact to the outside upper surface and the side surface of the moving rail 10 formed around the upper engaging window 11 and the side engaging window 13 through the simple assembly of the lever assembly 30, it is possible to improve the assembling convenience of the lever assembly 30.

Figure 8:
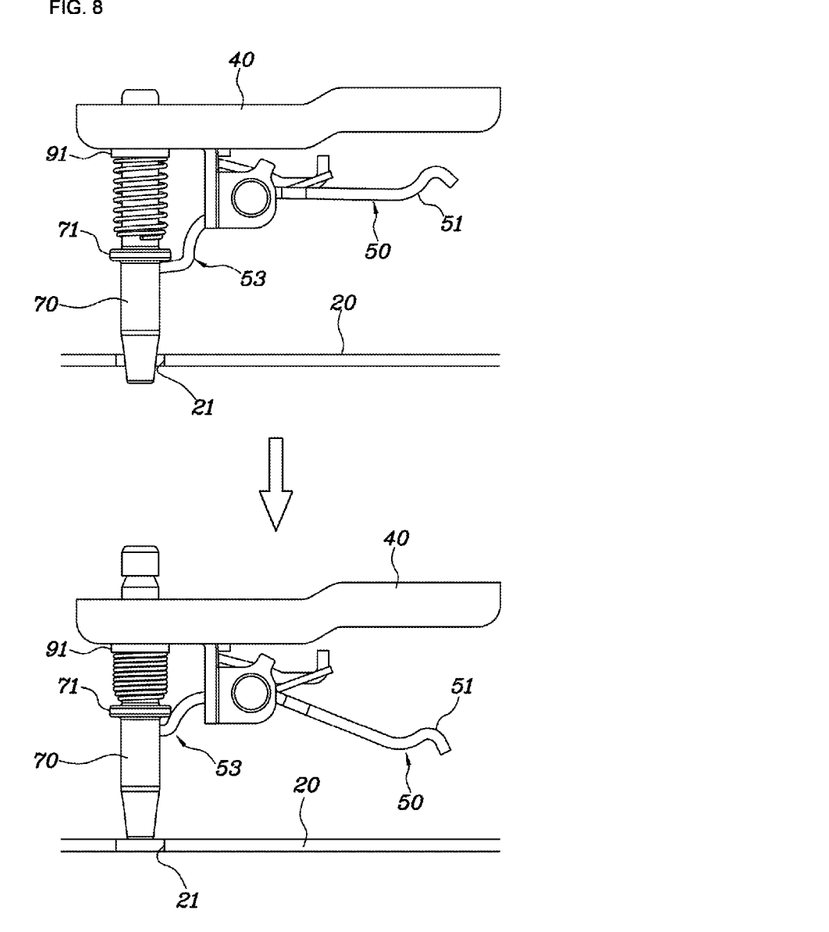
FIG. 8 is a diagram illustrating a state before and after the locking operation using the seat-rail locking apparatus.

Meanwhile, referring to FIGS. 2 and 8, the present disclosure can be configured so that the unlock flange 71 is formed at the interruption of the locking pin 70, and when assembling the lever assembly 30 to the moving rail 10, the unlock flange 71 is located in the inner space of the moving rail 10.

For example, a number of guide holes 41 is formed at the end portion of the fixing bracket 40 along the lengthwise direction in which the moving rail 10 is moved, the locking pins 70 are each provided in the guide holes 41, and a large number of locking pins 70 can be provided in the fixing bracket 40. At this time, a structure that allows the upper and lower guide movement of the locking pin 70 but inhibits detachment of the locking pin 70 from the guide hole 41 may be separately prepared between the guide hole 41 and the locking pin 70.

Further, a fork-shaped fork portion 53 is formed at the other end portion of the unlock lever 50, the other end portion of the unlock lever 50 is caught in the bottom of the unlock flange 71 to vertically move the locking pin 70 at the time of rotational movement of the unlock lever 50, and thus, the locking pin 70 can be locked or unlocked to the locking hole 21 formed in the fixed rail 20.

At this time, a locking restoring spring 80 may be provided between the upper face of the unlock flanges 71 and the bottom surface of the fixing bracket 40 to provide an elastic restoring force to the movement direction of the locking pin 70 that is moved upward.

According to this configuration, the fork portion 53 of the unlock lever 50 and the unlock flange 71 portion of the locking pin 70 are disposed inside the seat-rail, and the upward moving operation of the locking pin 70 is also performed within the inner space of the seat-rail, thereby reducing the components attached or exposed to the outside of the seat-rail. Thus, it is possible to provide a compact design of the seat-rail by enhancing the upper space utilization of the moving rail 10, and it is possible to improve marketability of the seat-rail locking apparatus.

Meanwhile, a method for assembling the apparatus for locking the vehicle seat-rail of the present disclosure described earlier may include a preparing step and an assembling step.

Referring to FIGS. 5 and 7, first, at the preparing step, it is possible to prepare the lever assembly 30 in which the locking pin 40 and the unlock lever 50 are coupled to the fixing bracket 70 in a module.

For example, since the lever assembly 30 is configured so that the locking pin 70 is provided through one side portion of the fixing bracket 40 and the unlock lever 50 is coupled to the other side portion of the fixing bracket 40, the lever assembly 30 can be prepared in a module.

At this time, since the locking pin 70 penetrates with respect to the fixing bracket 40 in a vertical state, when assembling the locking pin 70 to the moving rail 10, the lower end portion of the locking pin 70 can be disposed to face the upper engaging window 11.

Further, the unlock lever 50 is rotatably coupled to the fixing bracket 40 in a state of being oblique with respect to the vertically coupled locking pin 70, and in another form, in a state in which its lower end portion is obliquely inclined toward the lower end portion of the locking pin 70. Thus, when assembling the unlock lever 50 to the moving rail 10, the lower end portion of the unlock lever 50 may be disposed to face the side engaging window 13.

That is, according to the above-described configuration, since the lower end portion of the locking pin 70 is vertically arranged toward the upper engaging window 11, and the lower end portion of the unlock lever 50 is obliquely arranged toward the side engaging window 13, when assembling the lever assembly 30 to the moving rail 10, the locking pin 70 and the unlock lever 50 can assembled to the moving rail 10 at a time.

In particular, as described above, in the present disclosure, it is possible to add a structure that restricts the unlock lever 50 from being excessively rotated in one direction.

For example, the rotation stopper 57 is formed to protrude from the side surface of the unlock lever 50, and the fixing stopper 47 is provided in the rotation path of the rotation stopper 57 to regulate the excessive rotation of the unlock lever 50 in the nearly vertical direction at the time of rotation of the unlock lever 50.

That is, before assembling the lever assembly 30 to the moving rail 10, when the excessive rotation of the unlock lever 50 is not regulated and the unlock lever 50 rotates nearly vertically, since the lower end portion of the unlock lever 50 does not face the side engaging window 13, finally, there is a need for an operator to perform a work of holding the lower end portion of the unlock lever 50 and pushing it into the side engaging window 13 at the time of assembling work, and thus, there is a problem of declines in assembling characteristics and assembly convenience of the locking apparatus.

Therefore, in the case of the present disclosure, before assembling the lever assembly 30 to the moving rail 10 through a stopper structure, by maintaining a state in which the lower end portion of the unlock lever 50 faces the side engaging window 13, the working convenience for assembling the lever assembly 30 to the moving rail 10 is improved.

Next, at the assembling step, the lower end portion of the locking pin 70 is inserted into the upper engaging window 11 formed at the upper end portion of the rail, and at the same time, the lower end portion of the unlock lever 50 is inserted into the side engaging window 13 formed at the side end portion of the moving rail 10, thereby being able to assembling the lever assembly 30 to the moving rail 10 at a time.

For example, since the lower end portion of the locking pin 70 and the lower end portion of the unlock lever 50 are inserted into the upper engaging window 11 and the side engaging window 13, the fixing bracket 40 can be fixed to the outer upper surface and the side surface of the moving rail 10 formed around the engaging window.

According to such a configuration, it is possible to appropriately regulate the position of the other end portion of the unlock lever 50 so that the other end portion of the unlock lever 50 is not deviated in a direction other than the direction facing the side engaging window 13. Therefore, when assembling the lever assembly 30 to the moving rail 10, since the locking pin 70 and the unlock lever 50 are simultaneously inserted into the engaging windows formed in the moving rail 10 without interfering with the moving rail 10, thereby improving the assembly convenience of the lever assembly.

While the present disclosure has been illustrated and described with reference to exemplary forms thereof, it will be understood by those skilled in the art that various changes in form and details may be made therein without departing from the spirit and scope of the present disclosure.

What is claimed is:

1. An apparatus for locking a vehicle seat-rail, comprising:
    a locking pin configured to pass through a fixing bracket and configured to be linearly movable; and
    a detachment preventing means configured to inhibit the locking pin from being detached from the fixing bracket in a direction, while allowing the linear movement of the locking pin,
    wherein the detachment preventing means comprises:
        a catching jaw formed in one end portion of the locking pin;
        a guide hole formed at an end portion of the fixing bracket, another end portion of the locking pin configured to pass through the guide hole; and
        a fixing bush formed in a shape to wrap around the locking pin, the fixing bush fixed to an inner surface of the guide hole, while guiding the locking pin, an end portion of the fixing bush being caught on the catching jaw.

2. The apparatus of claim 1, wherein the fixing bush comprises:
    a support plate in which a bush hole is formed, the locking pin configured to be inserted into the bush hole and which is supported on a bottom surface of the fixing bracket;
    an engaging hook portion that is formed to be spaced along a circumferential direction of the bush hole is fixed to the support plate at a lower end portion,
    wherein the engaging hook portion comprises: an upper end portion caught on an upper surface of the fixing bracket, while passing through the guide hole; and
    a support portion that is formed to be spaced along the circumferential direction of the bush hole is fixed to the support plate at a lower end portion, and
    wherein the support portion comprises an upper end portion caught on the bottom surface of the catching jaw, while passing through the guide hole.

3. The apparatus of claim 2, wherein the engaging hook portion and the support portion are alternately arranged along the circumferential direction of the bush hole.

4. The apparatus of claim 2, wherein each of the engaging hook portion and the support portion is arranged to face each other around an axial center of the bushing hole.

5. The apparatus of claim 2, wherein an upper end portion of the support portion is formed to be bent toward an axial center of the bushing hole, and the locking pin is configured to slide along an upper end inner circumferential surface of the support portion that is formed to be bent.

6. The apparatus of claim 1, wherein the catching jaw is formed with an inclined portion in a shape that is gradually narrowed toward one end portion of the locking pin at an interruption of the locking pin, and a maximum diameter of the locking pin meeting an upper end portion of the inclined portion is formed to correspond to a diameter of a lower end portion of the inclined portion, wherein the catching jaw is be formed on the upper end portion of the inclined portion.

7. The apparatus of claim 1, further comprising:
    a moving rail with the fixing bracket fixed to an outer surface thereof; and
    an unlock lever in which an interruption is rotatably coupled to the fixing bracket,
    wherein a rotation stopper is formed to protrude from a side surface of an unlock lever, and a fixing stopper is provided on a path in which the rotation stopper rotates, thereby regulating the unlock lever from excessively rotating in one direction at a time of rotation of the unlock lever.

8. The apparatus of claim 7, wherein the unlock lever comprises one end portion located outside the moving rail and another end portion located inside the moving rail, wherein the rotation stopper is formed between the interruption of the unlock lever and the one end portion of the unlock lever, and wherein the fixing stopper is formed at an upper end position of a portion in which the unlock lever is axially coupled, and the rotation stopper is caught on the fixing stopper when the one end portion of the unlock lever rotates toward an upper end portion of the fixing bracket.

9. The apparatus of claim 8, wherein lever coupling portions are formed to protrude from both side ends of the fixing bracket, and the interruption of the unlock lever is axially coupled between the lever coupling portions, and wherein the fixing stopper is formed to protrude from the upper end of the lever coupling portion.

10. The apparatus of claim 9, wherein a circular pinhole is formed at a center of the lever coupling portion, and a hinge pin is coupled to the interruption of the unlock lever, and wherein both end portions of the hinge pin are coupled to a pinhole to pass through, thereby inhibiting the detachment of the hinge pin coupled to the pin hole.

11. The apparatus of claim 8, wherein a lever assembly in which the unlock lever is coupled to a side portion of the fixing bracket, while the locking pin penetrates the fixing bracket is assembled in a module, wherein an upper engaging window and a side engaging window are formed in each of an upper end portion and a side end portion of the moving rail, and wherein upon assembly of the lever assembly to the moving rail, while a lower end portion of the locking pin is inserted to the upper engaging window and the other end portion of the unlock lever is inserted to the side engaging window, the fixing bracket is fixed to an outer upper surface and a side surfaces of the moving rail formed around the engaging window.

12. The apparatus of claim 11, wherein an unlock flange is formed at the interruption of the locking pin, and upon assembly of the lever assembly to the moving rail, the unlock flange is located in an interior space of the moving rail.

13. The apparatus of claim 12, wherein a plurality of locking pins is provided, and the other end portion of the unlock lever is formed in a fork shape, and wherein when the unlock lever rotates, the other end portion of the unlock lever is caught on a bottom surface of the unlock flange to vertically operate the locking pin.

* * * * *